United States Patent [19]

Murakawa

[11] Patent Number: 4,686,750

[45] Date of Patent: Aug. 18, 1987

[54] AUTOMATIC CLIP MOUNTING DEVICE

[75] Inventor: Shoji Murakawa, Kaizu, Japan

[73] Assignee: Toyoda Gosei Co., Ltd., Nishikasugai, Japan

[21] Appl. No.: 811,874

[22] Filed: Dec. 20, 1985

[30] Foreign Application Priority Data

Dec. 21, 1984 [JP] Japan .................. 59-271574

[51] Int. Cl.⁴ ............................................. B23P 23/04
[52] U.S. Cl. ................................................... 29/34 R
[58] Field of Search ..................... 29/34 R, 34 B, 565

[56] References Cited

U.S. PATENT DOCUMENTS 4,369,907 1/1983 Muhr et al. ................. 29/34 B X
4,578,846 4/1986 Schott et al. .................. 29/34 B

FOREIGN PATENT DOCUMENTS 142668 7/1980 Fed. Rep. of Germany ...... 29/34 B

Primary Examiner—Timothy V. Eley
Attorney, Agent, or Firm—Cushman, Darby & Cushman

[57] ABSTRACT

An automatic clip mounting device for automating a punching step and a clip mounting step at a same working position in working an elongated work without relocating the work. The device comprising a support bed for holding the elongated work, a clamp device for fixing the work held by the support bed, a punching device for punching the work fixed by the clamp device, a clip setting device for gripping a clip and mounting the clip at a position where the clip is punched by the punching device, a clip supplying device for supplying the clip to the clip setting device, and a sequential moving device for moving a moving base, where the punching device and the clip setting device are mounted, to a working position of the work fixed by the clamp device and the support bed.

1 Claim, 11 Drawing Figures

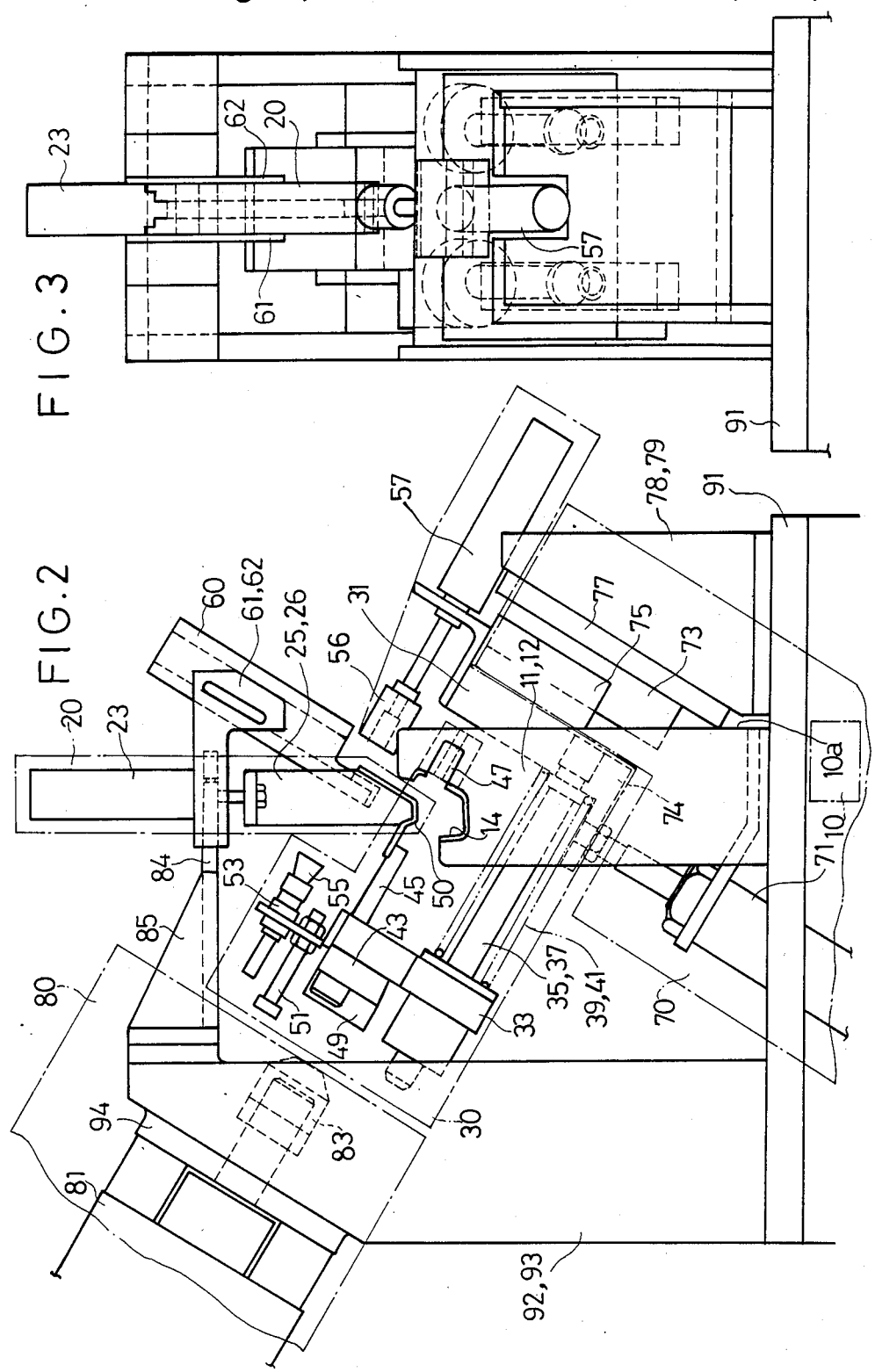

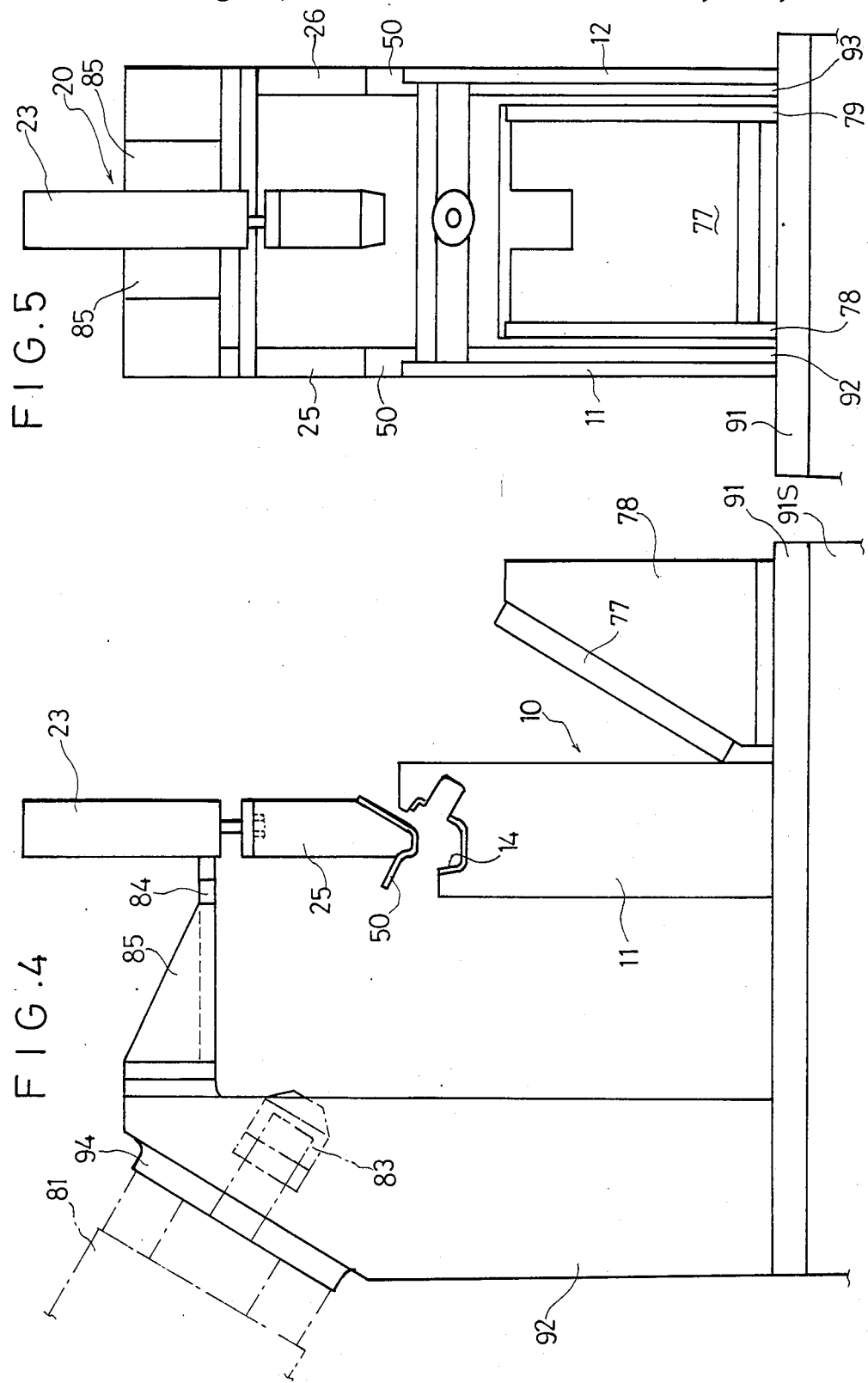

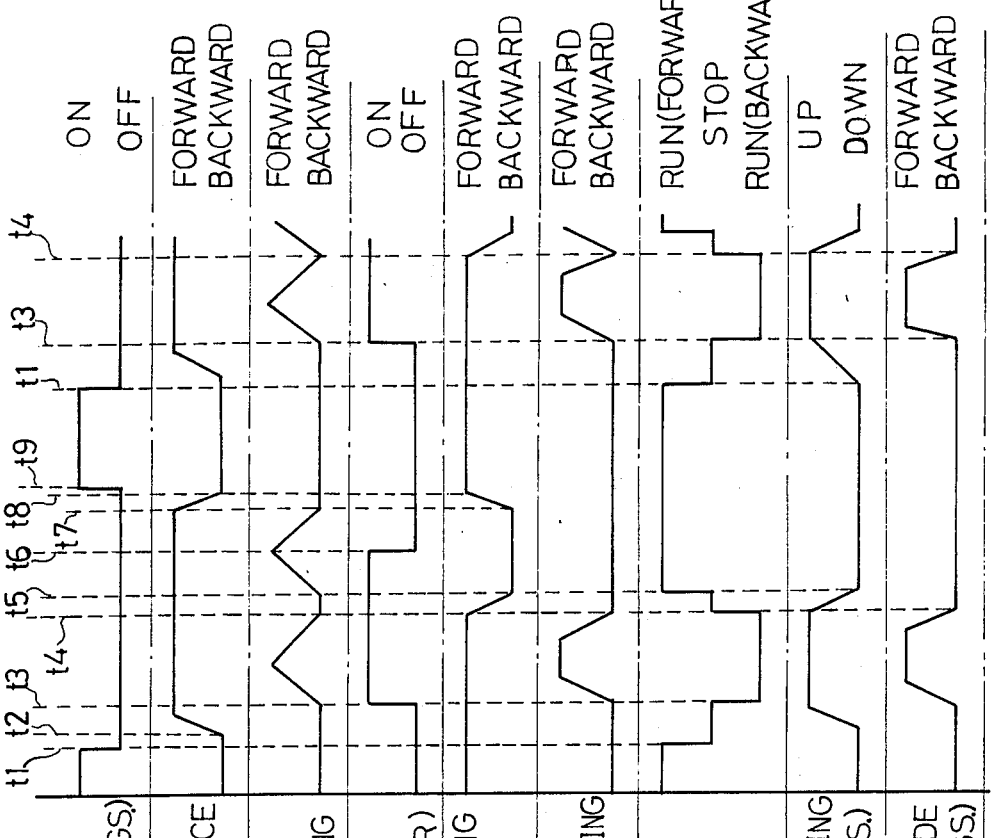

AUTOMATIC CLIP MOUNTING DEVICE

BACKGROUND OF THE INVENTION

1. Field of the Invention

This invention relates to an automatic clip mounting device for automating a punching step and a clip mounting step in working or operating on an elongated work or work piece.

2. Description of the Prior Art

Conventionally, a radiator support in an automobile for example is produced by working an elongated work in the following steps. First, the elongated work is cut to a predetermined length, and a plurality of holes are formed through the work at predetermined intervals by using a plurality of drilling machines, multiple spindle drilling machines or punching presses. Then, clips are manually inserted into the holes by an operator. In another way, when the clips are mounted by a machine, the holes are sequentially detected one by one, and the clips are automatically inserted into the detected holes. The latter case as well as the former case of course requires the two steps of detecting the holes and inserting the clips into the holes, thereby causing a reduced productive efficiency. Further, as the step of forming the holes through the work and the step of mounting the clips are carried out at different places, or in discontinuous two steps, working efficiency is reduced. Additionally, in the case that the radiator support is produced by separate steps of the punching step and the clip inserting step, it is necessary to independently position the work in the separate steps. Especially, in the case that the work is made of rubber materials, the rubber materials are expanded and contracted in the separate steps, resulting in inaccurate positioning of the work.

SUMMARY OF THE INVENTION

Accordingly, it is an object of the present invention to provide an automatic clip mounting device which may automatically and continuously carry out a punching step, a clip setting step and a clip supplying step, at the same working position without relocating an elongated work, thereby to shorten the working time and increase the accuracy of punching without poor or inaccurate clip mounting, resulting in improvement in productivity and quality.

According to the present invention, there is provided an automatic clip mounting device comprising a support bed for holding an elongated work, a clamp device for fixing the work held by the support bed, a punching device for punching the work fixed by the clamp device, a clip setting device for gripping a clip and mounting the clip at a position where the work is punched by the punching device, a clip supplying device for supplying the clip to the clip setting device, and a sequential moving device for moving a movable base, where the punching device and the clip setting device are mounted, to a working position of the work fixed by the clamp device and the support bed.

The support bed has a predetermined mechanical strength, and is a member for holding the work. The contact surface between the support bed and the work may be in such a shape so as not to mar the work. The support bed may have a space near or in the center of the contact surface. The space may be used to treat the work by some part of the punching device or the clip setting device.

The clamp device is a device for fixing the work so as to effect smooth and accurate working, until a punching step and a clip mounting step are terminated, when the work held by the support bed is worked by the punching device and the clip setting device which will be described in detail. As a method of fixing the work, it may be fixed by suction with a vacuum pad or by a pushing and attracting force of a cylinder. In another way, it may be fixed by an iron piece attracted by an electromagnetic force.

The punching device is a device for forming a through-hole through the work which permits insertion of the clip. As a punching tool to be utilized for the punching device, a drill or a metal mold constituted of a punch and a die may be used, for example.

The clip setting device is a device for gripping a clip from the clip supplying device which will be described in detail and inserting the clip through the through-hole of the work formed by the punching device. As a means for gripping the clip, a suction means by a vacuum pad or a pneumatically operated finger device may be utilized. As a means for moving the clip so as to mount the same to the work, a reciprocating cylinder or a rack device with a pinion gear may be utilized.

The clip supplying device is a device for supplying the clip to a position where the clip may be gripped by the clip setting device. As a means for supplying the clip, there may be applied a device for giving vibration to a guide bed having a groove coincident with a shape of a leg portion of the clip to move the clip to a final position, or a device for pushing the clip in the groove from an axial direction of the groove by a push rod.

The sequential moving device has a movable base where the punching device and the clip setting device are mounted, and it acts to move and position the movable base so that the punching and clip mounting work may be effected to the work fixed by the support bed and the clamp device. A moving direction of the moving base may be linear or curvilinear. As a means for moving the movable base, a motor for generating a rotational force or a cylinder for generating a pushing and attracting force are used.

In operation, the work is supported on the support bed, and is fixed to the support bed by the clamp device. The punching device forms a hole at a predetermined position in the work, and is returned to an initial position. The clip supply device supplies a clip at a position where the clip may be gripped by the clip setting device. The clip setting device grips the clip from the clip supply device. The sequential moving device moves the clip setting device to a position where the clip may be mounted in the hole in the work.

The clip setting device acts to mount the clip in the hole in the work, and return to the initial position. The sequential moving device moves the punching device to the initial position where the operation is started.

In the present invention, several units of the clip mounting devices may constitute one group and in this case, all of the clip mounting devices in one group are designed to be simultaneously operated and each form a hole and insert a clip simultaneously in uniformity. Further, the distance of each movement of the mounting device may be adjustable by moving the same along guide rails, thereby to freely change the mount pitch of the clips. Therefore the clip mounting devices are preferably installed on a moving base or the like.

Other objects and features of the invention will be more fully understood from the following detailed description and appended claims when taken with the accompanying drawings.

BRIEF DESCRIPTION OF THE DRAWINGS

FIGS. 2 and 3 are side and front views of the clip mounting device, respectively;

FIGS. 4 and 5 are side and front views of an essential part including a clamp device of the clip mounting device, respectively;

FIG. 11 is a timing chart explaining operation of the clip mounting device in the preferred embodiment.

DETAILED DESCRIPTION OF THE PREFERRED EMBODIMENT

Figure 1:
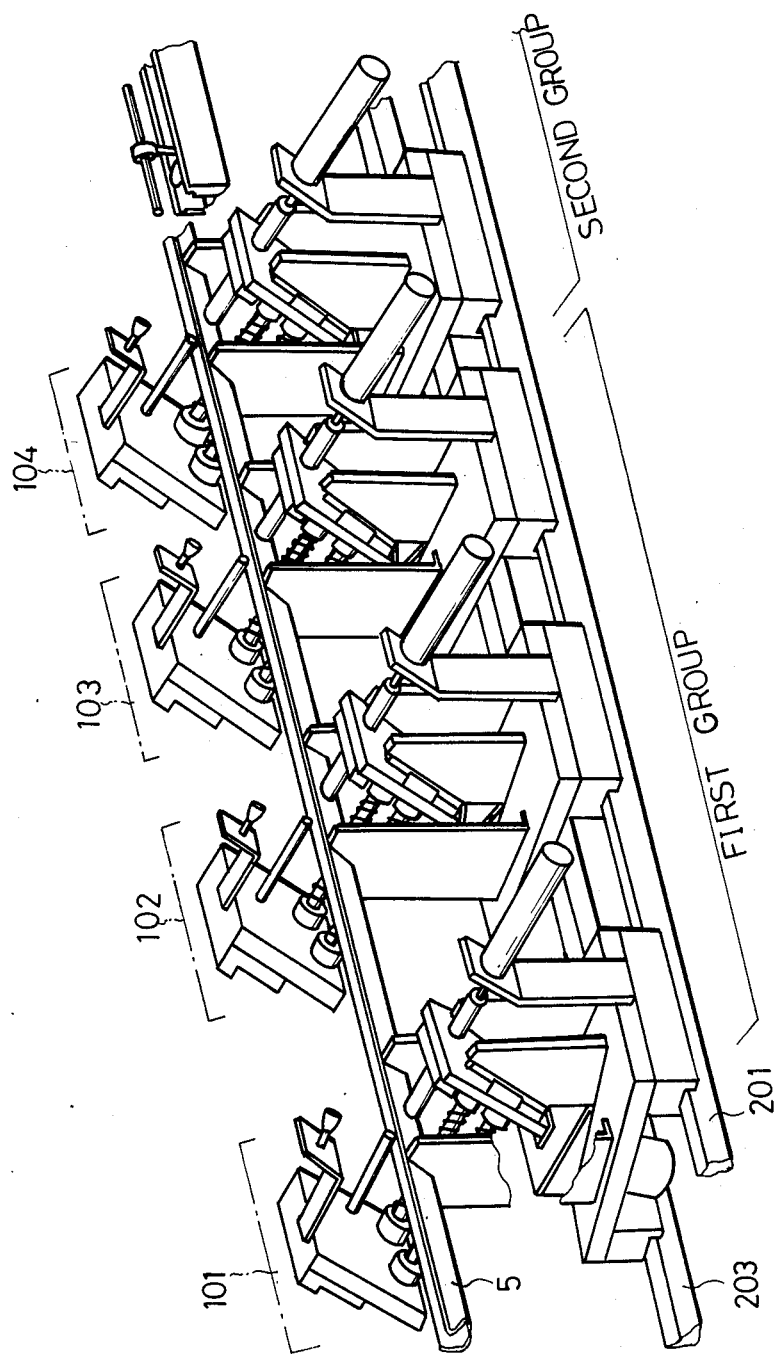
FIG. 1 is a layout of the clip mounting device constituted of three groups in a preferred embodiment, (a part of group 2 and an entire group 3 are not shown)
Figure 7:
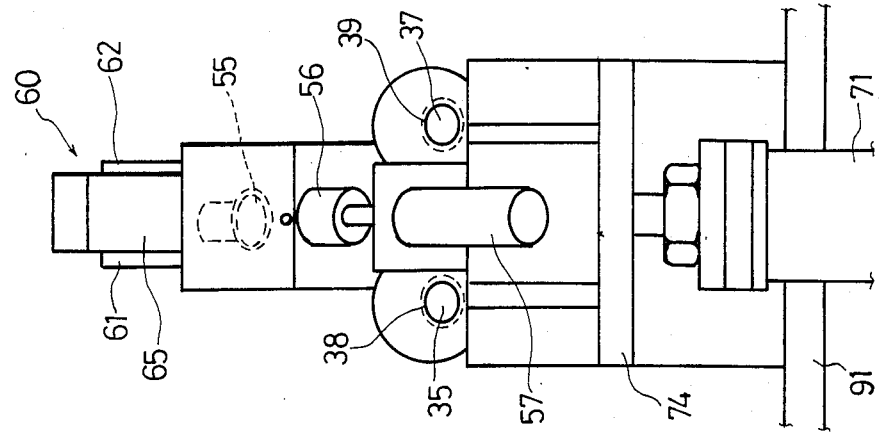
FIGS. 6 and 7 are side and front views of another essential part including punching device and the clip setting device of the clip mounting device, respectively.
Figure 6:
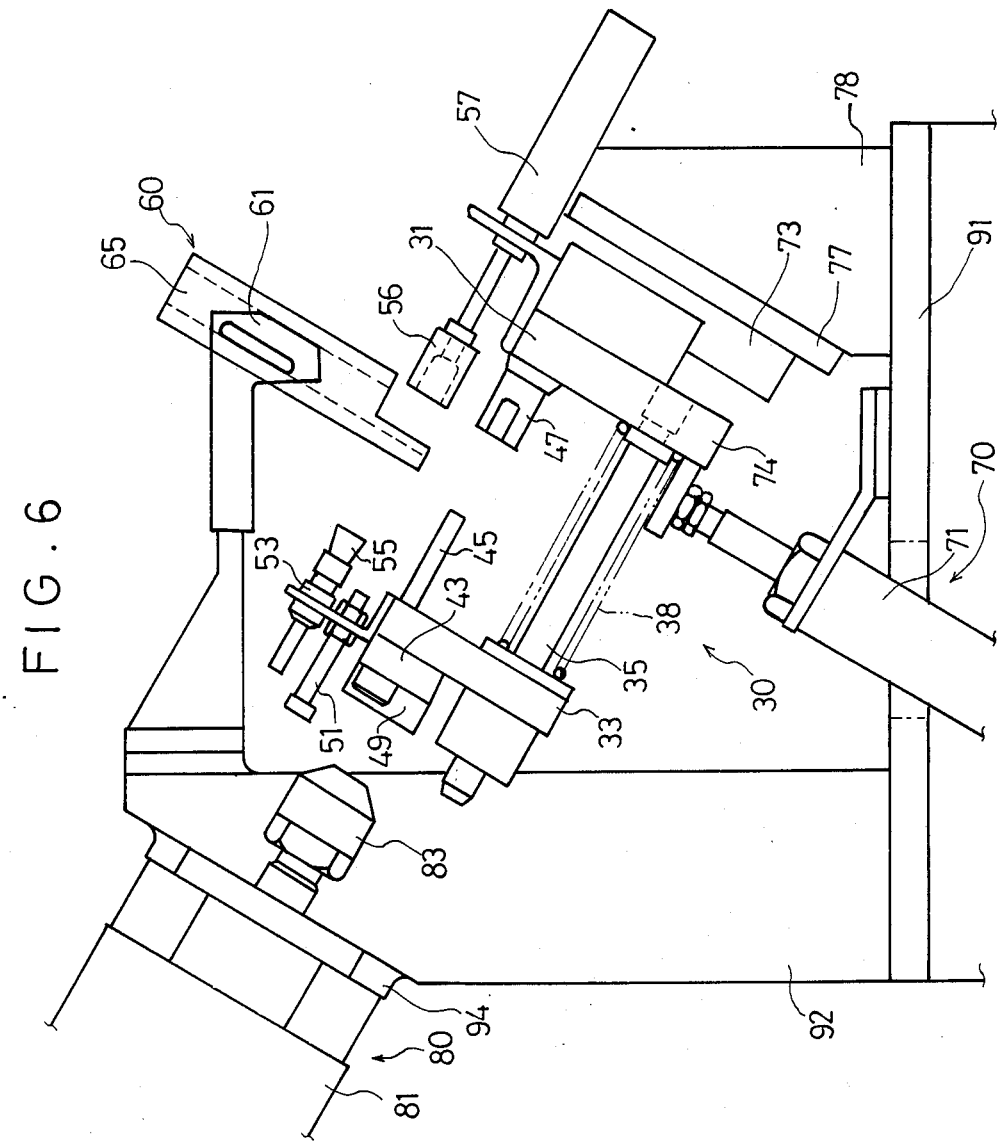
Figure 8:
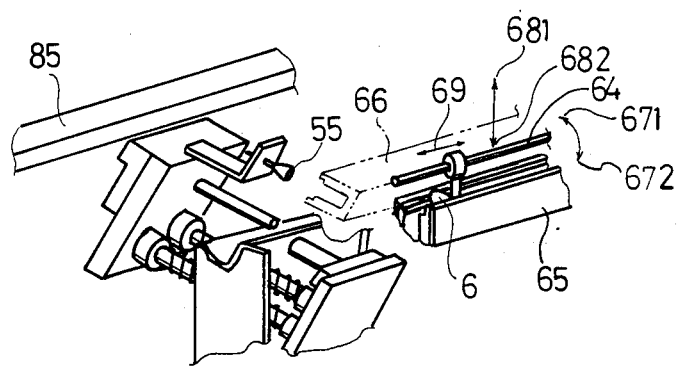
FIG. 8 is a perspective view of the essential part of the clip supplying device.

Referring to FIG. 1 which shows a layout of automatic clip mounting devices 101 to 104, all the devices are the same, which will be hereinafter simply referred to as a mounting device. The mounting devices 101 to 103 constitute a first group, the mounting device 104 constitutes a part of second group respectively. The other part of the second group and the third group are not shown. The three groups are simultaneously driven. For the sake of clarity, there are not shown a mount portion of an air cylinder serving as a drive source for the punching device and the clip setting device, and a clip supplying device.

Figure 9:
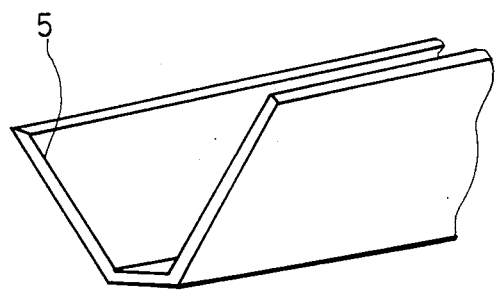
FIGS. 9 and 10 are perspective views of the work and the clip in the preferred embodiment, respectively.
Figure 10:

An object of the preferred embodiment is to obtain a radiator support for an automobile by mounting clip 6 as shown in FIG. 10 to a weather strip 5 (which will be hereinafter referred to as a work 5) as shown in perspective view in FIG. 9. The clip is similar to a tapping screw, and is formed by resin molding. The work 5 is inverted-trapezoidal in section, which is open at a wider mouth, while having a narrower bottom portion.

Each of the mounting devices is slidable on elongated guide rails 201 and 203, in which the cross section is almost rectangular in shape, for purposes of permitting the spacing of clips 6 mounted to the work 5 to be adjustable. As is aforementioned, all of the mounting devices are constituted of three groups, and each of the groups comprises three mounting devices. The mounting devices of one group are driven by one die set driving device which will be hereinafter described in detail.

FIGS. 2 to 8 show details of the mounting device 101 in side and front views, respectively.

The mounting device 101 comprises a slide member 91S sliding on the guide rails 201 and 203, a common base 91 mounted on the slide member 91S and formed of a substantially rectangular iron plate, a support bed 10 of a rectangular steel plate held by the common base 91, a clamp device 20 held by the support bed 10, a die set 30, a clip supplying device 60, a sequential moving device 70, and a die set driving device 80 (not shown) for driving the die set 30.

The support bed 10 is composed of a pair of upright rectangular steel plates 11, 12, the lower end of each of which is fixed by welding to the common base 91 as common stands for the mounting device 101. The tops of the steel plates 11, 12 are provided with a pair of positioning beds 14 having a holding surface with a sectional shape substantially identical with that of the work 5 to be mounted.

The clamp device 20 is primarily composed of a pair of arms 25 and 26 formed of a rectangular steel plate, a pair of push plates 50, which are substantially similar to the work 5 in section, fixed to the lower end portions of the arms 25 and 26 by flat head screws and an air cylinder 23 for holding the arms 25 and 26 at an end of the piston rod by a mount plate 22 and vertically moving the arms 25 and 26. The clamp device 20 is fixed to the common base 91 through a rectangular retainer plate 84 supported by a triangular reinforcing plate 85, and through support columns 92 and 93, fixed by welding to the retainer plate, which columns are formed of a rectangular steel plate.

In the embodiment, there are provided a working jig for the punching device and the clip mounting device at the die set 30, and a die set driving device 80 (not shown) for driving the punching device and the clip setting device as a driving means.

The die set 30 is primarily composed of a rectangular movable base 31, a rectangular movable die plate 33, a pair of guide posts 35 and 37 fixed to the movable base 31 for guiding the movable die plate 33 so as not to be out of position, and a pair of return springs 38 and 39 for allowing the movable die plate 33 to be easily returned to an initial position. The movable base 31 is slidably guided with a guide plate 73 fixed to the common base 91 and is fixed to the sequential moving device 70 which will be hereinafter described in detail.

The movable die plate 33 is provided with a punch 45 held by a punch holder 43 for forming a round hole for permitting insertion of the leg portion of the clip 6 through the work 5 with the aid of a pierce die 47 provided on the movable base 31. The movable die plate 33 is also provided with a vacuum pad 55 connected to a coupling 53 for gripping the head of the clip 6 by utilizing atmospheric pressure. The die plate has a pressure recieving bed 49 and a pressure receiving pin 51 which are hit or pressed respectively by the die set driving device 80 and receive a force for pressing down the movable die plate 33. In an extended direction of a central axis of the vacuum pad 55, a clip mount receiver 56 is retained by the end portion of the piston rod of an air cylinder 57 mounted to the movable base 31.

As shown in FIGS. 2 and 6–8, the clip supplying device 60 is primarily composed of a pair of elongated guide plates 65 for arranging the clips 6 to sequentially move the same and having a sectionally U-shaped guide channel, adjust plates 61 and 62 fixed to the retainer plate 84 by a bolt and nut, so as to adjust a distance and an angle between the head of the lowest clip held by the guide plate 65 and the vacuum pad 55 when the clip 6 is moved to a final position, a push rod 64 (shown in FIG. 8) for pushing the clip 6 along the channel of the guide plate 65 in a direction depicted by an arrow 69 and a guide plate driving device (not shown) for moving the push rod 64 in a direction depicted by an arrow 681 to rotate the guide plate 65 counterclockwise or in a direction depicted by an arrow 671 and then stop the same at a position 66 shown by a dashed line where the vacuum pad 55 can grip the clip. Then, the guide plate 65 is rotated clockwise or in a direction depicted by an arrow 672 to move the push rod 64 in a direction depicted by an arrow 682 by the guide plate driving device.

The sequential moving device 70 is primarily composed of a fixed guide plate 73 provided with a dovetail groove, and an air cylinder 71 for pushing and attracting the movable base 31. The movable base 31 slides in engagement with the dovetail groove of the plate 73 which is fixed through an auxiliary plate 77 and support plates 78 and 79 to the afore-mentioned common base 91.

The die set driving device 80 is composed of the support columns 92 and 93, a support plate 94 fixed to the support columns 92 and 93, and an air cylinder 81 having a rod cover 83. In the present embodiment, all the mounting devices 101 to 104 as shown in FIG. 1 are simultaneously operated.

There will now be described the operation of the mounting devices with reference to timing charts as shown in FIG. 11, in which an axis of abscissas represents an elapsed time, while references of alphabetical symbols (a) to (i) along an axis of ordinates represent names of actuators.

At an initial state of timing $T=t1$ (which will be hereinafter simply referred to as $T=ti$; $i=1, 2, \ldots$) work 5 is supplied to the clamping device 20. In this stage, the cylinder 23 is retracted. A motor for supplying work 5 ((a) in FIG. 11) is stopped and the cylinder 81 for work punching and clip mounting ((c) in FIG. 11) is retracted. The vacuum pad 55 ((d) in FIG. 11) is inoperative and the air cylinder 71 for driving the die set 30 ((e) in FIG. 11) is at a forward or extended position. The cylinder 57 for clip mounting ((f) in FIG. 11) is retracted. A motor for clip supply ((g) in FIG. 6) is stopped and a cylinder for clip forwarding ((h) in the FIG. 11) is at the downward or extended position while a cylinder ((i) in FIG. 11) is holding the guide plate 65 at its retracted position.

During the period of $t2 \leq T < t3$, the cylinder 23 ((b) in FIG. 11) starts moving from retracted to advanced to clamp the work 5 with the clamping device 20 and at the same time, the cylinder ((h) in FIG. 11) also starts moving from advanced to retracted. Therefore, during the period of $t3 \leq T < t4$, the cylinder 23 is at its advanced or forward position while the cylinder ((h) in FIG. 11) is in its upward position. In this stage, the cylinder 81 ((c) in FIG. 11) moves forward in order for clip 6 to be gripped by the vacuum pad 55 ((d) in FIG. 11) and punching of the work 5 is carried out as the punch 45 moves toward the pierce die 47 on the movable base 31. Simultaneously, a vacuum generator is actuated in order for the operative pad 55 to be vacuum and consequently, the vacuum pad 55 functions to hold the clip 6 by means of a suction force. Consequently, the cylinder 57 moves forward. Then, the punch 45 and the vacuum pad 55 move back by the function of the springs 38, 39.

At the timing of $t4 \leq T < t5$, the cylinder 81 is at its retracted position and the vacuum pad 55 is holding the clip 6 by the suction force. In this stage, the cylinder 71 starts to retract for positioning the die set 30 downward.

At the timing $t5 \leq T < t6$, the cylinder 71 stops actuating and stays at its retracted position. In the same state, the cylinder 81 starts reactuating and advances the vacuum pad 55 so that the clip 6 is pushed firmly into the hole in work 5.

At the timing $T=t6$, the cylinder 81 is at the forward position again with the clip 6 still being held in the hole in work 5. Then, at this point, the vacuum generator stops actuating. As a result, the clip 6 held by the vacuum pad 55 is released. At the same time, the cylinder 81 starts moving backward.

During the timing $t6 < T < t7$, the cylinder 23 starts to retract while the cylinder 71 starts advancing.

At the timing $T=t7$, the cylinder 23 has completed backward movement while the cylinder 71 has also completed forward movement.

At the timing $t8 \leq T < t9$, the work 5 is fed forward as the motor for work supply ((a) in FIG. 11) is operated.

The steps in the period of $t1 \leq T \leq t8$ are repeated from $T=t1$. In the above-mentioned operation, since the nine mounting devices are simultaneously actuated, nine clips can be mounted to the work only by one cycle of operation.

According to the present embodiment, three mounting devices constitute one group, and the first to the third groups are arranged, all of which are designed to be simultaneously operated. Further, the distance between mounting devices may be adjustable by moving the same along the guide rails thereby to freely change the mount pitch of the clips. Moreover, the punching and mounting operation may be automated to improve quality and productivity.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

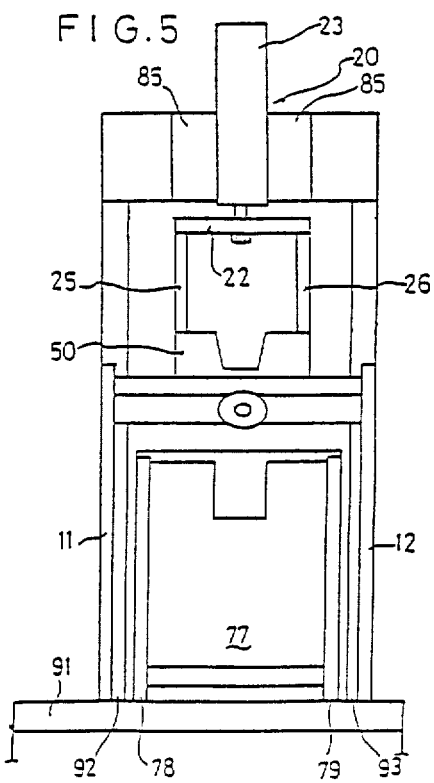

What is claimed is:

1. An automatic clip mounting device comprising:
main base;
support bed mounted to said main base for holding an elongated work movable longitudinally step-by-step;
a clamp device mounted to said main base for clamping the work, between movements thereof, to said bed;
a support base mounted for movement generally at right angles to the work;
a punching device mounted to said support base for punching a hole in the work when clamped by said clamp device;
a clip setting device mounted to said support base for extracting a clip from a supply thereof and gripping the clip and inserting it in a hole previously punched in the work by said punching device;
means mounted to said main base for moving said support base between a punching and clip extracting position, wherein said punching device can punch a hole in the work and the clip setting device can extract and grip a clip, and an inserting position wherein said clip setting device can insert a clip in a hole previously punched in the work by said punching device; and
means for operating said punching device to punch a hole in the work and for operating said clip setting device to extract and grip a clip when said support base is in said punching and clip extracting position, and for operating said clip setting device to insert a clip in a hole in the work, previously punched therein by said punching device, when said support base is in said inserting position.

* * * * *

UNITED STATES PATENT AND TRADEMARK OFFICE
CERTIFICATE OF CORRECTION

PATENT NO. : 4,686,750

DATED : August 18, 1987

INVENTOR(S) : MURAKAWA, Shoji

It is certified that error appears in the above-identified patent and that said Letters Patent is hereby corrected as shown below:

Figure 5 of the drawings is corrected as illustrated on the attached sheet.

Signed and Sealed this

Fourth Day of April, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,686,750

DATED : August 18, 1987

INVENTOR(S) : MURAKAWA, Shoji

It is certified that error appears in the above-identified patent and that said Letters Patent is hereby corrected as shown below: